(12) United States Patent
Hayashi

(10) Patent No.: US 11,331,959 B2
(45) Date of Patent: May 17, 2022

(54) TIRE

(71) Applicant: BRIDGESTONE CORPORATION, Tokyo (JP)

(72) Inventor: Naohiro Hayashi, Hino (JP)

(73) Assignee: BRIDGESTONE CORPORATION, Tokyo (JP)

( * ) Notice: Subject to any disclaimer, the term of this patent is extended or adjusted under 35 U.S.C. 154(b) by 346 days.

(21) Appl. No.: 16/338,231

(22) PCT Filed: Jun. 19, 2017

(86) PCT No.: PCT/JP2017/022574
§ 371 (c)(1),
(2) Date: Mar. 29, 2019

(87) PCT Pub. No.: WO2018/066180
PCT Pub. Date: Apr. 12, 2018

(65) Prior Publication Data
US 2019/0232730 A1    Aug. 1, 2019

(30) Foreign Application Priority Data
Oct. 6, 2016 (JP) .............................. JP2016-198139

(51) Int. Cl.
*B60C 13/02* (2006.01)
*B60C 13/00* (2006.01)

(52) U.S. Cl.
CPC .............. *B60C 13/02* (2013.01); *B60C 13/00* (2013.01); *B60C 13/001* (2013.01); *B60C 13/002* (2013.01)

(58) Field of Classification Search
CPC .............................. B60C 13/02; B60C 13/002
See application file for complete search history.

(56) References Cited

U.S. PATENT DOCUMENTS

| 4,809,757 | A | 3/1989 | Shurman |
| 2010/0294412 | A1 | 11/2010 | Inoue et al. |
| 2012/0097305 | A1* | 4/2012 | Kuroshi ................. B60C 13/02 |
| | | | 152/523 |
| 2013/0075006 | A1 | 3/2013 | Kojima et al. |
| 2013/0168002 | A1 | 7/2013 | Mishima |
| 2013/0292025 | A1 | 11/2013 | Kuroishi et al. |
| 2015/0266347 | A1 | 9/2015 | Kodama et al. |

(Continued)

FOREIGN PATENT DOCUMENTS

| CN | 1907740 A | 2/2007 |
| CN | 102458885 A | 5/2012 |
| CN | 103072435 A | 5/2013 |

(Continued)

OTHER PUBLICATIONS

Jul. 11, 2017 International Search Report issued in International Patent Application No. PCT/JP2017/022574.

*Primary Examiner* — Timothy Kennedy
*Assistant Examiner* — Farah Taufiq
(74) *Attorney, Agent, or Firm* — Oliff PLC

(57) ABSTRACT

A tire capable of showing a sufficient cooling effect on a tire side portion when a vehicle travels at a low speed. A pneumatic tire includes a projection group in a tire side portion. A gap is formed between a first projection and a second projection. A size of the gap in a tire radial direction is smaller than a size of each of the first projection and the second projection in the tire radial direction.

5 Claims, 6 Drawing Sheets

(56) References Cited

U.S. PATENT DOCUMENTS

2016/0016440 A1\* 1/2016 Matsumura ........... B60C 15/024
152/523

FOREIGN PATENT DOCUMENTS

| JP | 2007-245945 | A | 9/2007 |
| --- | --- | --- | --- |
| JP | 2008-222006 | A | 9/2008 |
| JP | 5081477 | B2 | 11/2012 |
| JP | 2013-136332 | A | 7/2013 |
| JP | 2014-080099 | A | 5/2014 |
| WO | 2014/129572 | A1 | 8/2014 |
| WO | 2015/019975 | A1 | 2/2015 |

\* cited by examiner

TIRE

TECHNICAL FIELD

The present invention relates to a tire including a projection group having projections, each of which has a plate shape projected outward in a tire width direction from a surface of a tire side portion.

BACKGROUND ART

A tire including a projection group having projections, each of which has a plate shape projected outward in a tire width direction, is known (for example, Patent Literature 1). The projection group is formed on a tire side portion, namely a side wall.

Patent Literature 1 discloses the tire including the projection group having an outside extending projection arranged at an outer side in the tire radial direction and an inside extending projection arranged at an inner side in the tire radial direction. The outside extending projection is arranged to be partially overlapped with the inside extending projection in the tire radial direction.

According to such a tire, an air flow, which flows on the tire side portion in rolling of the tire, is turned into a turbulent flow. Consequently, a surface of the tire side portion around the projection group is actively cooled. In particular, since the outside extending projection and the inside extending projection are arranged to be partially overlapped in the tire radial direction, a cooling effect can be enhanced by not only the turbulent flow generated by an air flow getting over the projection group but also a turbulent flow (lateral turbulent flow) generated by an air flow passing between the outside extending projection and the inside extending projection.

CITATION LIST

Patent Literature

[PTL 1] Japanese Patent No. 5081477

SUMMARY OF INVENTION

When a vehicle travels at a predetermined speed or higher, the tire including the projection group described above shows a superior cooling effect, however when a vehicle such as a construction vehicle travels at a low speed (for example, 20 km/h or lower), the tire does not show a sufficient cooling effect.

Accordingly, an object of the present invention is, in consideration of the problem described above, to provide a tire capable of showing a sufficient cooling effect on a tire side portion when a vehicle travels at a low speed.

A tire according to one aspect of the present invention includes a projection group having projections, each of which has a plate shape projected outward in a tire width direction from a surface of a tire side portion. The projection group is arranged between a tire maximum width position in the surface of the tire side portion and an outer end of a bead core in the tire radial direction.

The projection group includes a first projection, and a second projection extended in the tire radial direction at an outer side in the tire radial direction with respect to the first projection. A gap is formed between the first projection and the second projection in a view from a tire circumferential direction. A size of the gap in the tire radial direction is smaller than a size of each of the first projection and the second projection in the tire radial direction.

DESCRIPTION OF EMBODIMENTS

Figure 1:
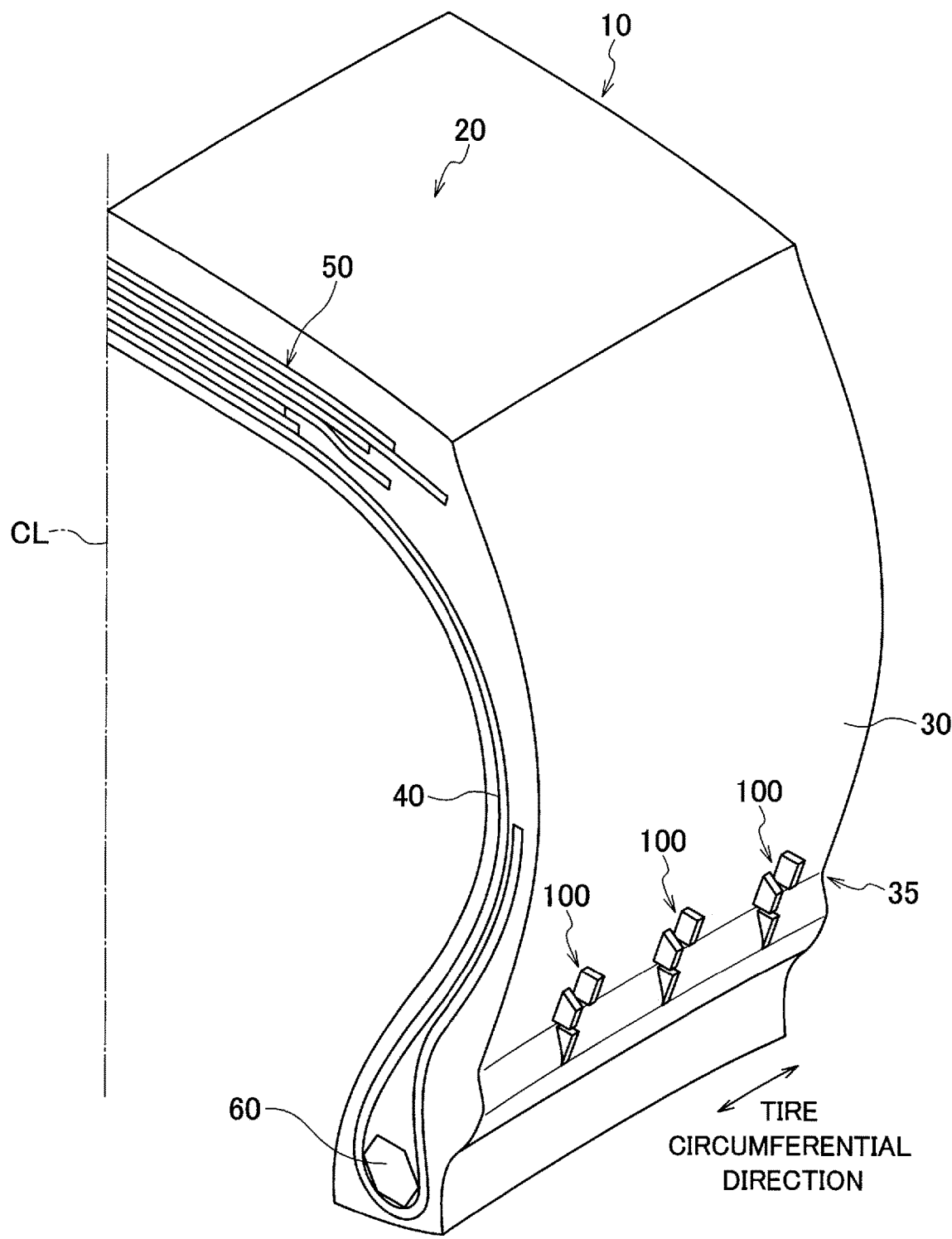
FIG. 1 is a perspective view of a part of a pneumatic tire 10.

Hereinafter, embodiments will be described with reference to the drawings. Further, the same or similar reference numerals are assigned to parts having the same function or the same configuration, and therefore the description thereof is accordingly omitted.

(1) Whole Configuration of Pneumatic Tire

Figure 2:
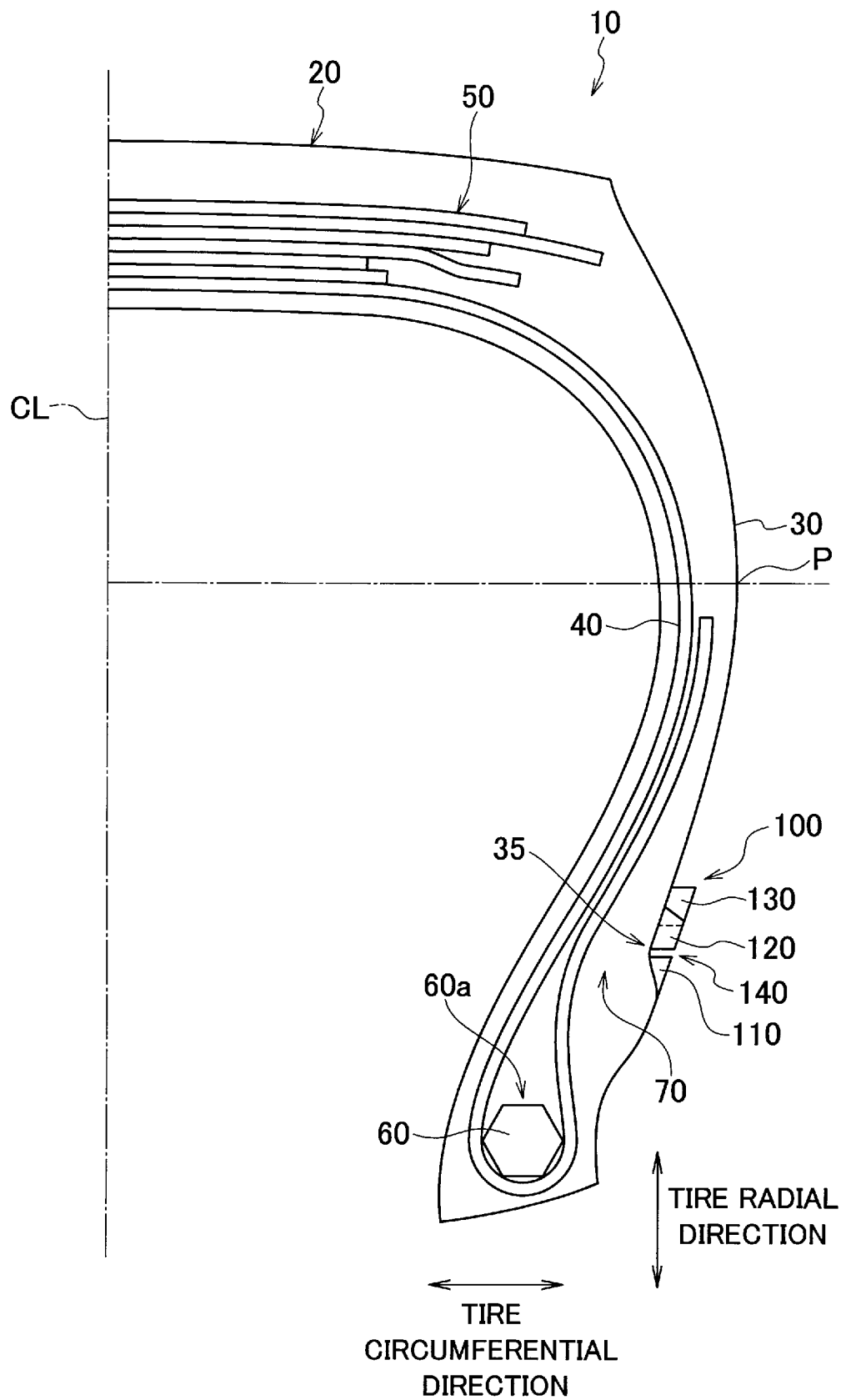
FIG. 2 is a cross-sectional view along a tire width direction of a part of the pneumatic tire 10.

FIG. 1 is a perspective view of a part of a pneumatic tire 10. FIG. 2 is a cross-sectional view along a tire width direction of a part of the pneumatic tire 10.

As shown in FIG. 1 and FIG. 2, the pneumatic tire 1 includes a tread 20 and a tire side portion 30. In each of FIG. 1 and FIG. 2, a part at one side with respect to a tire equatorial line CL is illustrated, however a part at another side with respect to the tire equatorial line CL is similar (symmetry) to the part at the one side.

The pneumatic tire 10 is used in, for example, construction vehicles such as a dump truck, an articulate dump truck, a wheel loader and the like travelling on a macadam road or travelling in a mine or a dam construction site. Gas other than air (for example, nitrogen gas), or a small amount of liquid (for example, coolant) may be filled in the pneumatic tire 10 mounted to a rim wheel.

The tread 20 is a portion contacted with a road surface. Practically, a pattern (not shown) corresponding to a use environment of the pneumatic tire 10 or the construction vehicle to which the pneumatic tire 10 is mounted is formed on the tread 20.

The tire side portion 30 is continued to the tread 20 to be located at an inner side in the tire radial direction with respect to the tread 20. Specifically, the tire side portion 30 is a portion between an outer end in a tire width direction of the tread 20 and an upper end of a bead core 60. The tire side portion 30 is also called a side wall.

A carcass 40 forms a frame of the pneumatic tire 10. The carcass 40 has a radial structure including a carcass cord (not shown) arranged radially along the tire radial direction. However, the carcass 40 is not limited to the radial structure, and therefore the carcass 40 may has a bias structure including a carcass cord arranged to cross the tire radial direction.

A belt layer 50 is arranged at an inner side in the tire radial direction with respect to the tread 20. The belt layer 50 is formed by a plurality of belts (for example, four to six belts), each of the belts has a cord.

A bead core 60 is arranged at an inner side of the tire side portion 30 in the tire radial direction. The bead core 60 is formed in a circular shape. The carcass 40 is folded via the bead core 60 from the inner side in the tire width direction toward the outer side in the tire width direction.

The pneumatic tire 10 includes a plurality of projection groups 100. The projection group 100 is formed by a plurality of projections. Each of the projections is formed in a plate shape projected outward in the tire width direction from a surface of the tire side portion 30. In the present embodiment, the projection group 100 is formed by a first projection 110, a second projection 120, and a third projection 130 (see FIG. 2). The first projection 110 and the second projection 120 are separated in the tire radial direction. A gap 140 (see FIG. 2) is formed between the first projection 110 and the second projection 120.

When the pneumatic tire 10 rolls on a road surface, the projection group 100 generates a turbulent flow on the surface of the tire side portion 30. The turbulent flow (air flow) facilitates an active heat exchange with the tire side portion 30, and thereby a heat dissipation effect on the surface of the tire side portion 30 is enhanced.

The projection group 100 is arranged between a tire maximum width position P (see FIG. 2) on the surface of the tire side portion 30 and an outer end 60a of the bead core 60 in the tire radial direction.

Specifically, the projection group 100 is arranged in a recess portion 35 recessed inward in the tire width direction. The recess portion 35 is formed by a portion with a thin rubber gage in the tire side portion 30. In the recess portion 35, heat generated inside the pneumatic tire 10 is easily transmitted to the surface of the tire side portion 30.

With the projection group 100 arranged in the recess portion 35, a portion of the tire side portion 30 apt to be high in temperature can be actively cooled.

(2) Configuration of the Projection Group 100

Figure 3:
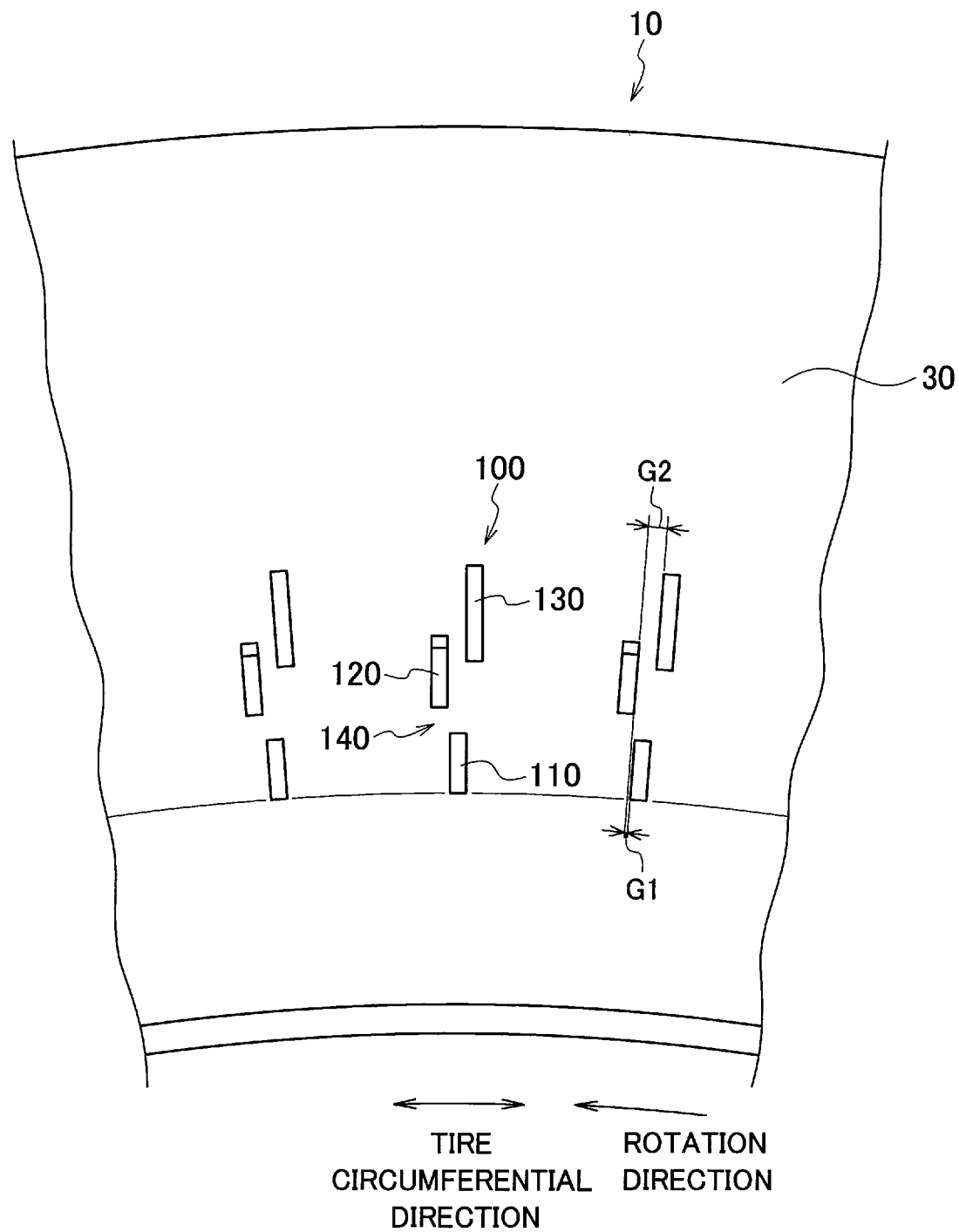
FIG. 3 is a side view of a part of the pneumatic tire 10.
Figure 4:
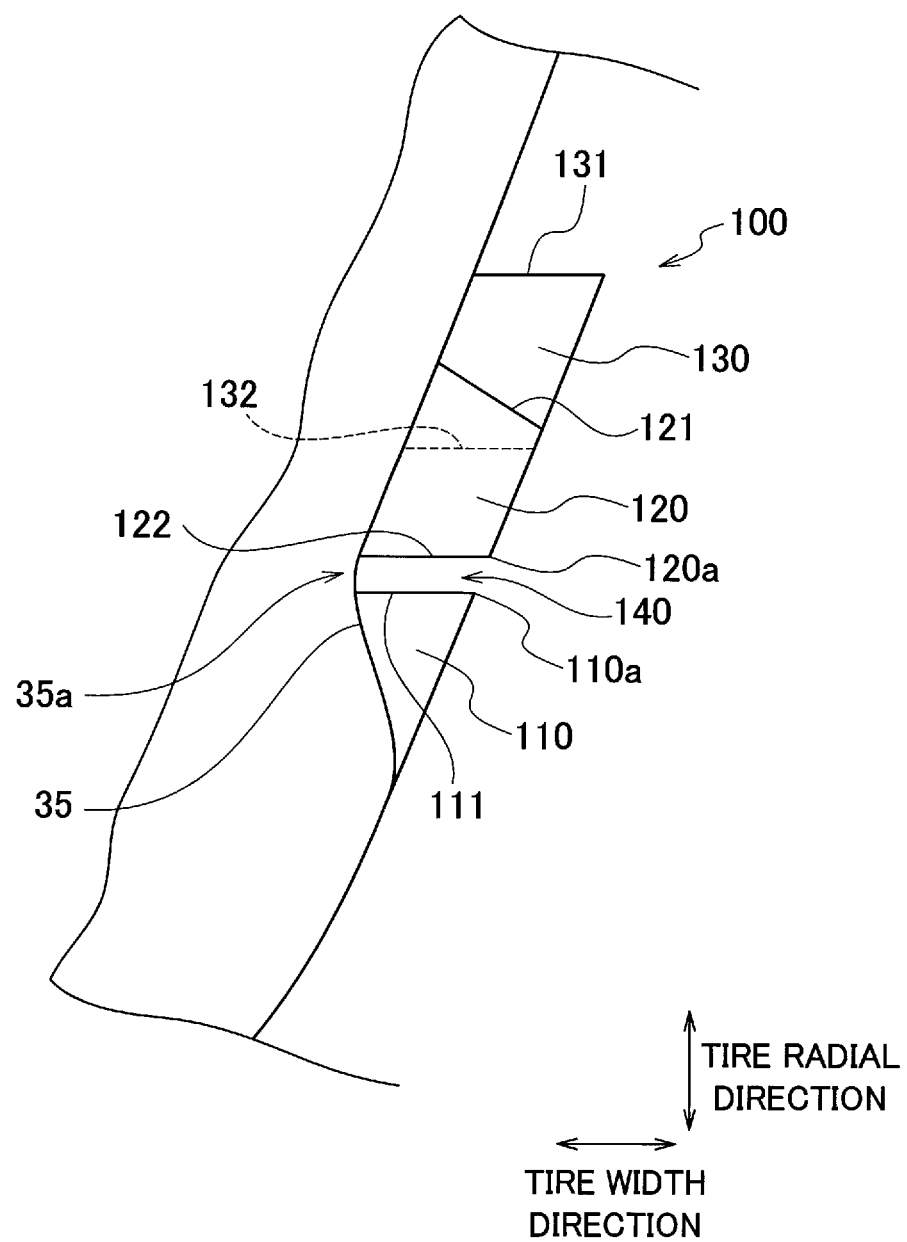
FIG. 4 is an enlarged front view of a projection group 100.

Next, a specific configuration of the projection group 100 will be described. FIG. 3 is a side view of a part of the pneumatic tire 10. FIG. 4 is an enlarged front view of the projection group 100.

As shown in FIG. 3 and FIG. 4 and as described above, the projection group 100 is formed by the first projection 110, the second projection 120, and the third projection 130. The projection groups 100 are arranged on the surface of the tire side portion 30 at a predetermined interval. The projection groups 100 are preferably arranged in a whole circumference of the pneumatic tire 100, however the projection group 100 may not be arranged in a certain region in a tire circumferential direction of the pneumatic tire 100.

The first projection 110 is extended in the tire radial direction. Specifically, the first projection 110 is formed in a plate shape extended parallel to the tire radial direction. The first projection 110 is located at an innermost side in the tire radial direction.

As shown in FIG. 4, the first projection 110 is formed along an incline of the recess portion 35. Thus, the first projection 110 is formed in a triangular shape in a sectional view in the tire width direction of the pneumatic tire 10.

The second projection 120 is arranged adjacent to the first projection 110. An arrangement of the second projection 120 adjacent to the first projection 110 denotes that the first projection 110 and the second projection 120 are arranged to form the gap 140 described below in the tire radial direction. Further, in the tire circumferential direction, the first projection 110 and the second projection 120 may be partially overlapped, or alternatively, may be arranged separately. In a case in which the first projection 110 and the second projection 120 are arranged separately, the arrangement of the second projection 120 adjacent to the first projection 110 denotes, as described below, that an interval G1 between the first projection 110 and the second projection 120 is smaller than a half of an interval in the tire circumferential direction between the first projections 110 forming the projection groups 100 adjacent to each other in the tire circumferential direction.

The second projection 120 is extended in the tire radial direction at the outer side in the tire radial direction with respect to the first projection 110. Specifically, the second projection 120 is formed in a plate shape extended parallel to the tire radial direction.

The first projection 110 and the second projection 120 are arranged at positions different from each other in the tire circumferential direction. That is, the second projection 120 is arranged at a position offset from a position of the first projection 110 in the tire circumferential direction.

A size of the interval G1 in the tire circumferential direction between the first projection 110 and the second projection 120 is preferably set to two times or less of a thickness of the first projection 110 in the tire circumferential direction. The interval G1 denotes a distance in the tire circumferential direction between a side surface of the first projection 110 at a side of the second projection 120 and a side surface of the second projection 120 at a side of the first projection 110. In the present embodiment, the size of the interval G1 is equal to substantially zero.

An outer end 121 of the second projection 120 in the tire radial direction is inclined against the tire width direction. Specifically, the outer end 121 is inclined to be located at the inner side in the tire radial direction as being close to the outer side in the tire width direction.

The third projection 130 is arranged adjacent to the second projection 120. An arrangement of the third projection 130 adjacent to the second projection 120 denotes that, in the tire radial direction and the tire circumferential direction, the second projection 120 and the third projection 130 are arranged to be partially overlapped, or alternatively, are arranged separately. In a case in which the second projection 120 and the third projection 130 are arranged separately, the arrangement of the third projection 130 adjacent to the second projection 120 denotes, as described below, that an interval G2 between the second projection 120 and the third projection 130 is smaller than a half of an interval in the tire circumferential direction between the second projections 120 forming the projection groups 100 adjacent to each other in the tire circumferential direction.

The third projection 130 is extended in the tire radial direction at the outer side in the tire radial direction with respect to the second projection 120. Specifically, the third projection 130 is formed in a plate shape extended parallel to the tire radial direction.

A part of the third projection 130 is overlapped with the second projection 120 in a view from the tire circumferential direction (see FIG. 4). Specifically, an inner end 132 of the third projection 130 in the tire radial direction is located at the inner side in the tire radial direction with respect to the outer end 121 of the second projection 120.

The second projection 120 and the third projection 130 are arranged at positions different from each other in the tire circumferential direction. That is, the third projection 130 is arranged at a position offset from a position of the second projection 120 in the tire circumferential direction. In the present embodiment, the second projection 120 is arranged at the position different from the position of each of the first projection 110 and the third projection 130 in the tire circumferential direction.

A size of the interval G2 between the second projection 120 and the third projection 130 in the tire circumferential direction is preferably set to two times or less of a thickness of the second projection 120 in the tire circumferential direction. The interval G2 denotes a distance in the tire circumferential direction between a side surface of the second projection 120 at a side of the third projection 130 and a side surface of the third projection 130 at a side of the second projection 120. In the present embodiment, the size of the interval G2 is substantially equal to a thickness (a size in the tire circumferential direction) of each of the second projection 120 and the third projection 130.

In the view from the tire circumferential direction (see FIG. 4), namely in a sectional view of the pneumatic tire 10 in the tire width direction, an outer end 131 and the inner end 132 of the third projection 130 in the tire radial direction are substantially parallel to the tire width direction.

The gap 140 is formed between the first projection 110 and the second projection 120. That is, the gap 140 is formed by arranging the first projection 110 and the second projection 120 to be separated in the tire radial direction.

The gap 140 is formed in the recess portion 35. The recess portion 35 is provided with a maximally recessed portion 35*a* recessed maximally inward in the tire width direction. The gap 140 is formed in the maximally recessed portion 35*a*.

A size of the gap 140 in the tire radial direction is smaller than a size of each of the first projection 110 and the second projection 120 in the tire radial direction. The size of the gap 140 in the tire radial direction is uniform between the surface of the tire side portion 30 and a distal end of the projection group 110 in the tire width direction.

Specifically, a width of the gap 140 in the tire radial direction is substantially uniform between the surface of the tire side portion 30, and a distal end 110*a* of the first projection 110 and a distal end 120*a* of the second projection 120. In the present embodiment, each of the outer end 111 of the first projection 110 in the tire radial direction and the inner end 122 of the second projection 120 in the tire radial direction is formed linearly. Further, each of the outer end 111 and the inner end 122 is substantially parallel to the tire width direction. Thus, the width of the gap 140 in the tire radial direction is substantially uniform between the surface of the tire side portion 30, and the distal end 110*a* and the distal end 120*a*.

(3) Functions and Effects

Figure 5:
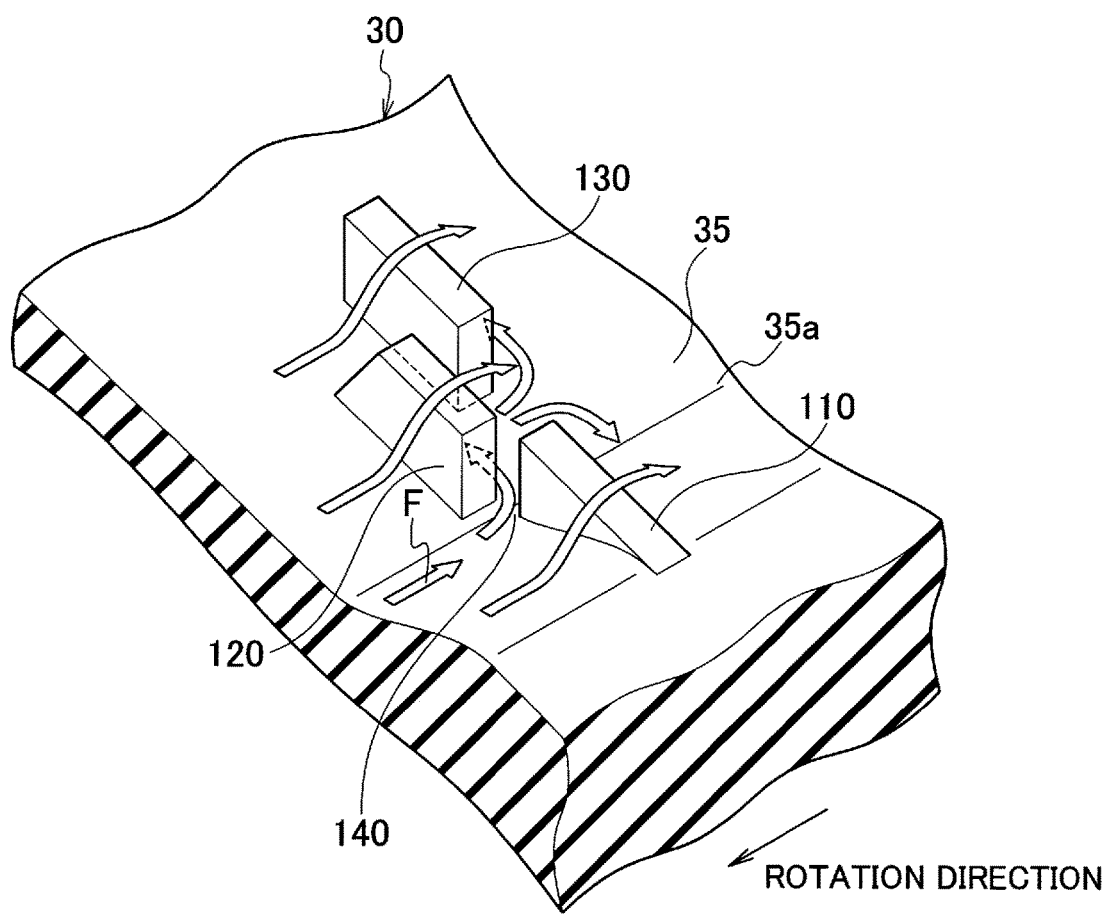
FIG. 5 is a view when a turbulent flow is generated by the projection group 100 arranged in the pneumatic tire 10.

Next, functions and effects of the pneumatic tire 10 will be described. FIG. 5 is a view when the turbulent flow is generated by the projection group 100 arranged in the pneumatic tire 10.

As shown in FIG. 5, when the pneumatic tire 10 mounted to a vehicle (not shown) rolls on a road surface, an air flow F (shown by an arrow in the figure) passes the surface of the tire side portion 30. The air flow F gets over the first projection 110, the second projection 120 and the third projection 130 extended in the tire radial direction, so that the air flow F is turned into a turbulent flow. Accordingly, a speed of the air flow on the surface of the tire side portion 30 arranged at the rear of the first projection 110, the second projection 120 and the third projection 130 is made fast, and thereby heat dissipation due to an active heat exchange is facilitated.

Further, the air flow F passing the gap 140 is turned into a turbulent flow intruding onto the surface of the tire side portion 30 arranged at the just rear of the first projection 110, the second projection 120 and the third projection 130. Further, the air flow F passing the gap 140 is also used to cool the surface of the maximally recessed portion 35*a*.

The surface of the tire side portion 30 can be further effectively cooled by the air flow F passing the gap 140. Such a projection group 100 shows the effect especially in a case in which the vehicle travels at a relatively low speed (for example, 20 km/h or low). Specifically, even in a case in which the intensity of the turbulent flow getting over the projection group 100 is low in the low speed travelling, the surface of the tire side portion 30 can be sufficiently cooled by the air flow F passing the gap 140.

Further, since the gap 140 is formed in the maximally recessed portion 35*a* of the recess portion 35 in which heat generated inside the pneumatic tire 10 is apt to be transmitted to the surface of the tire side portion 30, a portion whose surface temperature is apt to be high in the tire side portion 30 can be actively cooled.

Further, according to a result of an indoor drum test using the pneumatic tire 10 having a specification described below, it has been found that a temperature of the side portion 30 (specifically, a tire inside 70 corresponding to a position where the projection group 100 is formed) is decreased by approximately 6° C. to 8° C.

Tire size: 46/90R57

Position of the projection group 100: a position of 20 mm from a rim line toward the outside in the tire radial direction (a position of the inner end of the first projection 110 in the tire radial direction)

Pitch of the projection groups 100: 80 mm (every 5 degrees, 72 projection groups in the whole circumference)

Height of the projection group 100: 20 mm

Depth of the recess portion 35: 20 mm

Speed of the vehicle and a load: 10 km/h and 60 t, 20 km/h and 30 t

As described above, in the projection group 100, the gap 140 is formed between the first projection 110 and the second projection 120. The side of the gap 140 in the tire radial direction is smaller than the size of each of the first projection 110 and the second projection 120 in the tire radial direction. Further, the size of the gap 140 in the tire radial direction is uniform between the surface of the tire side portion 30 and the distal end of the projection group 100 in the tire width direction.

Accordingly, the surface of the tire side portion 30 can be sufficiently cooled by the turbulent flow generated from the air flow F passing the gap 140. With this, the cooling effect on the tire side portion 30 can be sufficiently obtained especially when the vehicle travels at a low speed. Here, in a case in which the size of the projection group 100 and the gap 140 do not fulfill the relation described above, such a cooling effect is hardly obtained.

More specifically, in a low speed travelling, it is effective to generate not only the turbulent flow by the air flow F getting over the projection group 100 but also the turbulent flow intruding to the rear of the projection group 100 after passing the gap 140.

In the present embodiment, the projection group 100 further includes the third projection 130, and a part of the third projection 130 is overlapped with the second projection 120 in a view from the tire circumferential direction. Thus, the air flow F is interrupted by the second projection 120 and the third projection 130, and thereby the intensity of the turbulent flow getting over the projection group 100 is made high and the intensity of the flow passing the gap 140 after passing a side portion of the projection group 100 is made high.

In the present embodiment, the gap 140 is formed in the maximally recessed portion 35a, and therefore the portion whose surface temperature is apt to be high in the tire side portion 30 can be actively cooled as described above.

In the present embodiment, the first projection 110 and the second projection 120 are arranged at the positions different from each other in the tire circumferential direction. Further, the third projection 130 is arranged at the position from those of the first projection 110 and the second projection 120 in the tire circumferential direction. That is, the first projection 110, the second projection 120, and the third projection 130 are arranged at the positions different from each other in the tire circumferential direction.

Further, the size of the interval G1 (see FIG. 3) between the first projection 110 and the second projection 120 is preferably set to two times or less of the thickness of the first projection 110 in the tire circumferential direction. Further, the size of the interval G2 (see FIG. 3) between the second projection 120 and the third projection 130 is preferably set to two times or less of the thickness of the second projection 120 in the tire circumferential direction. This configuration facilitates the generation of the turbulent flow intruding to each of the rear portions of the first projection 110, the second projection 120, and the third projection 130.

In the present embodiment, in the view from the tire circumferential direction, namely in the sectional view of the pneumatic tire 10 in the tire width direction, the outer end 111 of the first projection 110 and the inner end 122 of the second projection 120 are substantially parallel to the tire width direction. Similarly, the outer end 131 and the inner end 132 of the third projection 130 are substantially parallel to the tire width direction. Thus, in vulcanizing and molding the pneumatic tire 10, the projection group 100 is prevented from being a resistance when the tire side portion 30 is released from a tire mold (not shown) that molds the tire side portion 30.

In the present embodiment, the outer end 121 of the second projection 120 is inclined to be located at the inner side in the tire radial direction as being close to the outer side in the tire width direction. Thus, the projection group 100 is prevented from being a resistance when the tire side portion 30 is released from the tire mold, and this configuration can facilitate the generation of the turbulent flow intruding to the rear of the second projection 120.

(4) Other Embodiments

As described above, the content of the present invention was described through the embodiment. However, the present invention is not limited to the embodiment, and therefore it is obvious for a person skilled in the art that various modifications and improvements can be adopted.

Figure 6:
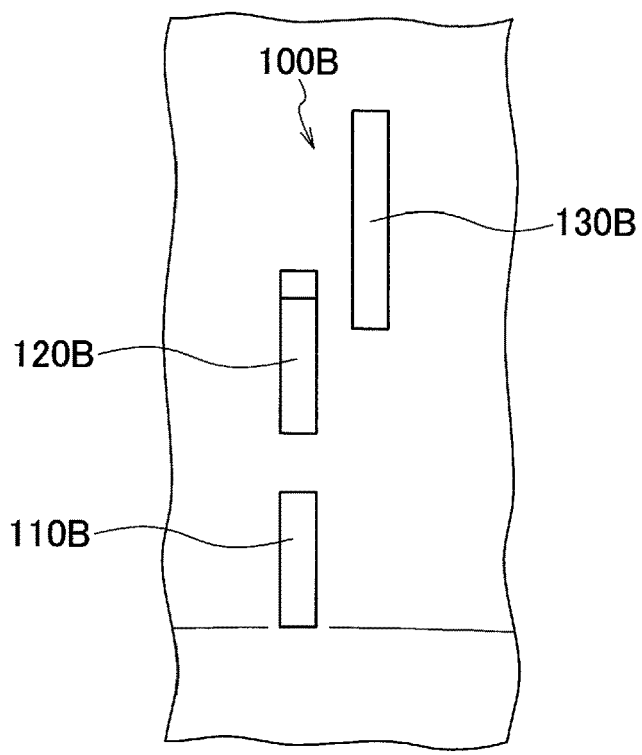
FIG. 6 is an enlarged side view of a projection group 100B.

For example, the projection group 100 described above may be modified as described below. FIG. 6 is an enlarged side view of a projection group 100B. Hereinafter, a difference against the projection group 100 described above will be mainly described.

As shown in FIG. 6, the projection group 100B is formed by a first projection 110B, a second projection 120B, and a third projection 130B. In the projection group 100B, the first projection 110B and the second projection 120B are not offset to each other in the tire radial direction, and therefore the first projection 110B and the second projection 120B are arranged at substantially the same position. That is, the first projection 110B and the second projection 120B are arranged on a straight line (not shown) along the tire radial direction in a tire side view.

Figure 7:
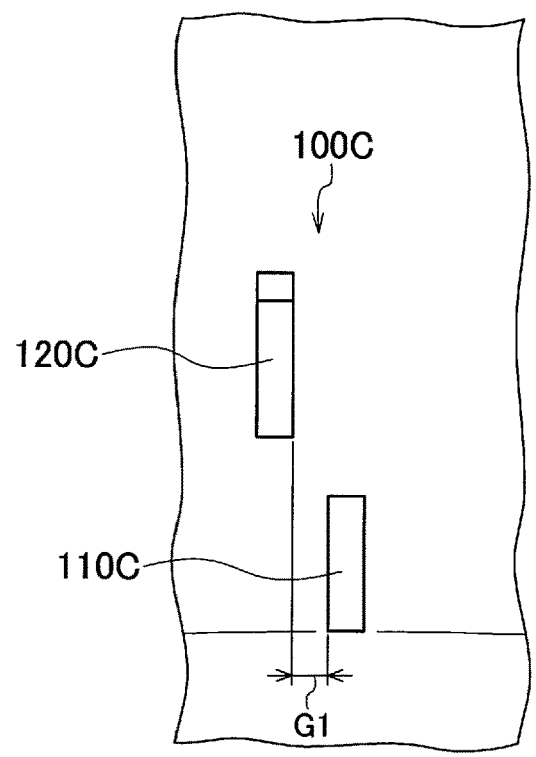
FIG. 7 is an enlarged side view of a projection group 100C.

FIG. 7 is an enlarged side view of a projection group 100C. As shown in FIG. 7, the projection group 100C is formed by a first projection 110C and a second projection 120C. That is, the projection group 100C is formed by only two projections, and therefore the projection group 100C excludes a third projection such as the third projection 130. Further, in the projection group 100C, a size of the interval G1 is substantially equal to a thickness of the first projection 110C in the tire circumferential direction.

Further, in the embodiment described above, the outer end 121 of the second projection 120 is inclined to be located at the inner side in the tire radial direction as being close to the outer side in the tire width direction. However, the outer end 121 is not necessarily inclined in such a manner.

In the embodiment described above, each of the first projection 110, the second projection 120, and the third projection 130 is formed in a plate shape, however each of them may be formed in a slight zigzag shape or a corrugate shape. Further, in the embodiment described above, the gap 140 is formed in a rectangular shape, however each shape of the outer end 111 and the inner end 122 may be formed in a zigzag shape or the like as long as the size of the gap 140 in the tire radial direction is uniform.

In the embodiment described above, the pneumatic tire 10 was described to be preferably used in a construction vehicle, however the pneumatic tire 10 may be used as a so-called heavy load tire mounted to a truck, a bus or the like as long as the vehicle travels at a relatively low speed.

As described above, although the embodiments of the present invention were described, the descriptions and drawings that form a part of this disclosure are not to be considered as limitation to the present invention. From this disclosure, a variety of alternate embodiments, examples, and applicable techniques will become apparent to a person skilled in the art.

The entire contents of Japanese Patent Application No. 2016-198139 (filed on Oct. 6, 2016) are incorporated herein by reference.

INDUSTRIAL APPLICABILITY

The tire according to the present invention can show a sufficient cooling effect on the tire side portion when a vehicle travels at a low speed.

REFERENCE SIGNS LIST

10: pneumatic tire
20: tread
30: tire side portion
35: recess portion
35a: maximally recessed portion
40: carcass
50: belt layer
60: bead core
60a: outer end
70: tire inside
100, 100B, 100C: projection group
110, 110B, 110C: first projection
110a: distal end
111: outer end
120, 120B, 120C: second projection
120a: distal end
121: outer end 122: inner end
130, 130B: third projection
131: outer end
132: inner end
140: gap
F: air flow
G1, G2: interval
P: tire maximum width position

The invention claimed is:

1. A tire comprising a projection group having projections, each of which has a plate shape projected outward in a tire width direction from a surface of a tire side portion, wherein:

the projection group is arranged between a tire maximum width position in the surface of the tire side portion and an outer end of a bead core;

the projection group comprises a first projection extended in a tire radial direction, and a second projection arranged adjacent to the first projection and extended in the tire radial direction at an outer side in the tire radial direction with respect to the first projection;

a gap is formed between the first projection and the second projection in a view from a tire circumferential direction;

a size of the gap in the tire radial direction is smaller than a size of each of the first projection and the second projection in the tire radial direction;

the projection group further comprises a third projection arranged adjacent to the second projection and extended in the tire radial direction at the outer side in the tire radial direction with respect to the second projection;

a part of the third projection is overlapped with the second projection; and the first projection, the second projection and the third projection are arranged at different positions in the tire circumferential direction in an order of the second projection, the first projection and the third projection.

2. The tire according to claim 1, wherein the size of the gap in the tire radial direction is uniform between the surface of the tire side portion and a distal end of the projection group in a tire width direction.

3. The tire according to claim 1, wherein:

a recess portion recessed inward in the tire width direction is formed in the tire side portion;

the recess portion comprises a maximally recessed portion recessed maximally inward in the tire width direction; and the gap is formed in the maximally recessed portion.

4. The tire according to claim 1, wherein an interval in the tire circumferential direction between the first projection and the second projection is set to two times or less of a thickness of the first projection in the tire circumferential direction.

5. The tire according to claim 2, wherein:

a recess portion recessed inward in the tire width direction is formed in the tire side portion;

the recess portion comprises a maximally recessed portion recessed maximally inward in the tire width direction; and the gap is formed in the maximally recessed portion.

\* \* \* \* \*